United States Patent
Al Daas

(10) Patent No.: US 11,263,374 B2
(45) Date of Patent: Mar. 1, 2022

(54) BISECTION NUMERICAL ALGORITHM COUPLED WITH PRESSURE DEVIATION METHOD TO DETERMINE THE SIZE AND LOCATION OF A LEAK IN A PIPELINE

(71) Applicant: Saudi Arabian Oil Company, Dhahran (SA)

(72) Inventor: Mutaz Al Daas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/061,425

(22) Filed: Oct. 1, 2020

(65) Prior Publication Data

US 2021/0116325 A1    Apr. 22, 2021

Related U.S. Application Data

(60) Provisional application No. 62/924,364, filed on Oct. 22, 2019.

(51) Int. Cl.
*G06F 30/28* (2020.01)
*G01M 3/28* (2006.01)
*G06F 113/14* (2020.01)

(52) U.S. Cl.
CPC .......... *G06F 30/28* (2020.01); *G01M 3/2815* (2013.01); *G06F 2113/14* (2020.01)

(58) Field of Classification Search
None
See application file for complete search history.

(56) References Cited

U.S. PATENT DOCUMENTS 8,635,051 B1 * 1/2014 Wu .................. G06N 3/126
                                             703/9
2017/0255717 A1   9/2017 Kumar et al.
(Continued)

FOREIGN PATENT DOCUMENTS

WO    WO 2019156661    8/2019

OTHER PUBLICATIONS

Abhulimen et al., "Liquid pipeline leak detection system: model development and numerical simulation" Chemical Engineering Journal 97 (2004) 47-67 (Year: 2004).*

(Continued)

*Primary Examiner* — John C Kuan
(74) *Attorney, Agent, or Firm* — Fish & Richardson P.C.

(57) ABSTRACT

Systems and methods include a method for locating a leak in a pipeline. Pressure and flowrate measurements are received corresponding to fluid flowing through a pipeline for which a leak is to be located in a pipeline segment. A calculated leak size is determined based pressure and flowrate measurements for upstream and downstream locations. A first assumed leak location is identified. A first assumed leak size is determined. A simulation is executed based on the first assumed leak size, first assumed leak location, and pressure and flowrate measurements, producing a virtually measured leak size. If a difference between the virtually measured and calculated leak size is not within acceptance criteria, a second assumed leak size is iteratively determined, the simulation is re-executed, and the difference is re-determined. A second assumed leak location is iteratively identified, and the simulation is re-executed to determine an estimated leak location of the leak.

20 Claims, 9 Drawing Sheets

(56) References Cited

U.S. PATENT DOCUMENTS

2017/0323039 A1* 11/2017 Kumar ................... G06F 30/20
2019/0169982 A1   6/2019 Hauge et al.

OTHER PUBLICATIONS

Boaz et al., "An overview of pipeline leak detection and location systems" Pan African International Conference on Science, Computing and Telecommunications (2014) (Year: 2014).*

Wu et al., "Pipeline Leak Location Using Optimization Method" Paper presented at the PSIG Annual Meeting, New Orleans, Louisiana, May 2015; Paper No. PSIG-1508 (Year: 2015).*

Sousa et al., "Locating Leaks in Water Distribution networks with Simulated Annealing and Graph Theory," Proc. Computer Control for Water Industry, 119:63-71, 13th Computer Control for Water Industry Conference, CCWI-201, 2015, 9 pages.

Verde et al., "Referenced Model-Based Observers for Locating Leaks in Branched Pipeline," Proc. Intl. Federation of Automatic Control (IFAC), 48-21:1066-1071, 2015, 7 pages.

PCT International Search Report and Written Opinion in International Appln. No. PCT/US2020/056791, dated Jan. 29, 2021, 17 pages.

Jin et al., "Integrated leakage detection and localization model for gas pipelines based on the acoustic wave method," Journal of Loss Prevention in the Process Industries, Elsevier, United Kingdom, Dec. 2013, 27(3): 74-88, 15 pages.

* cited by examiner

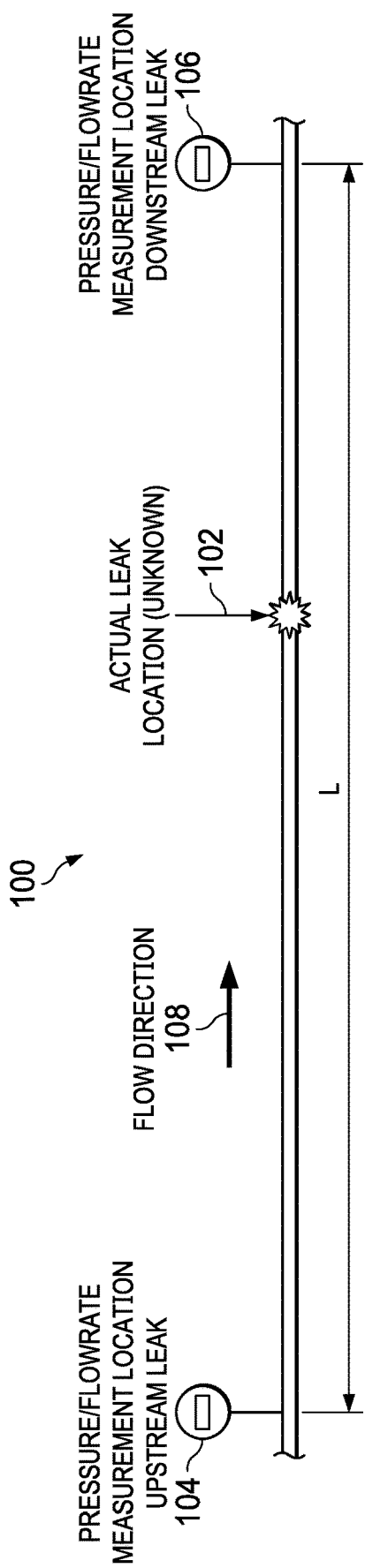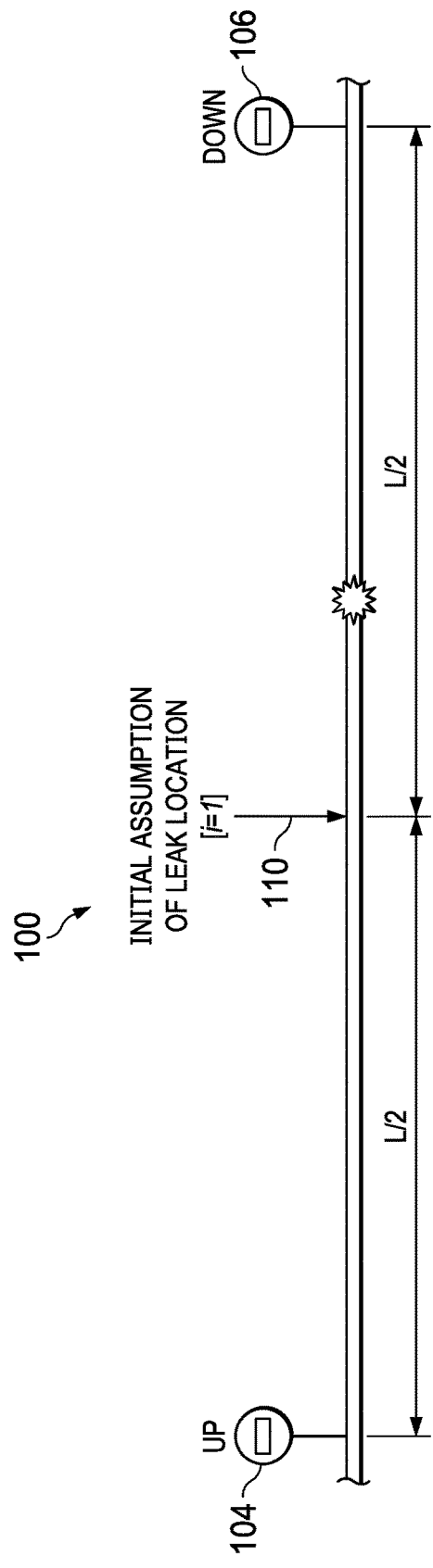
FIG. 1
FIG. 2

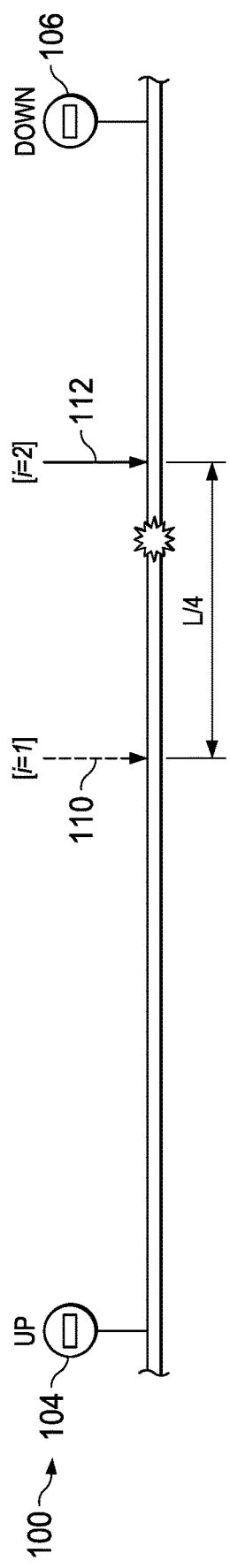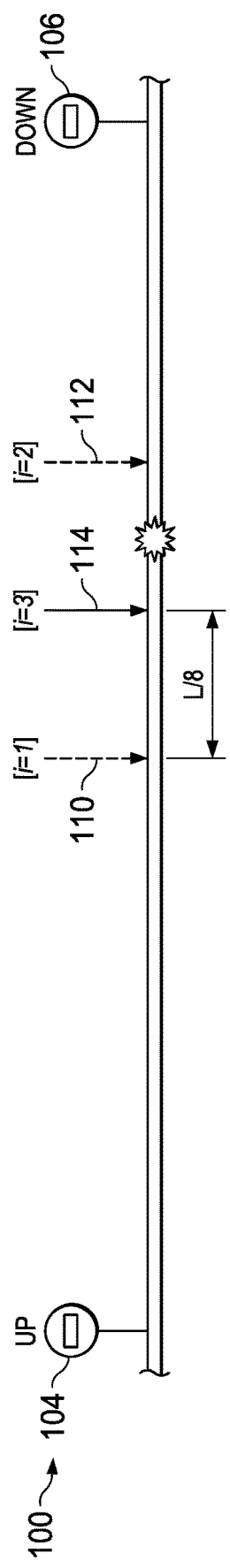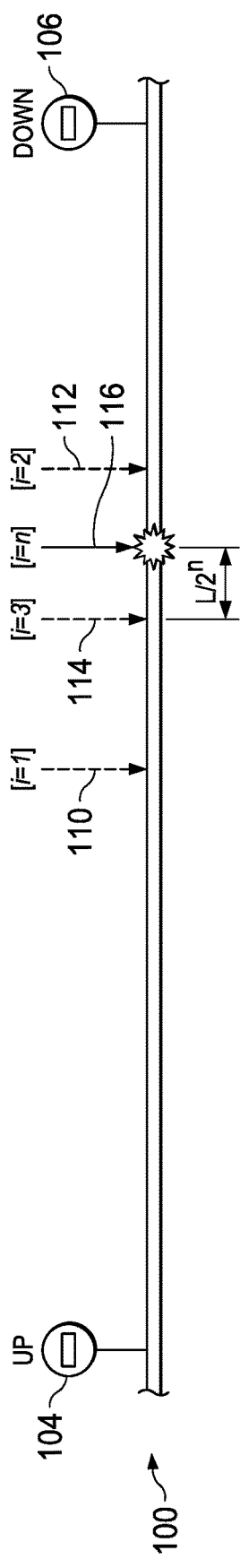

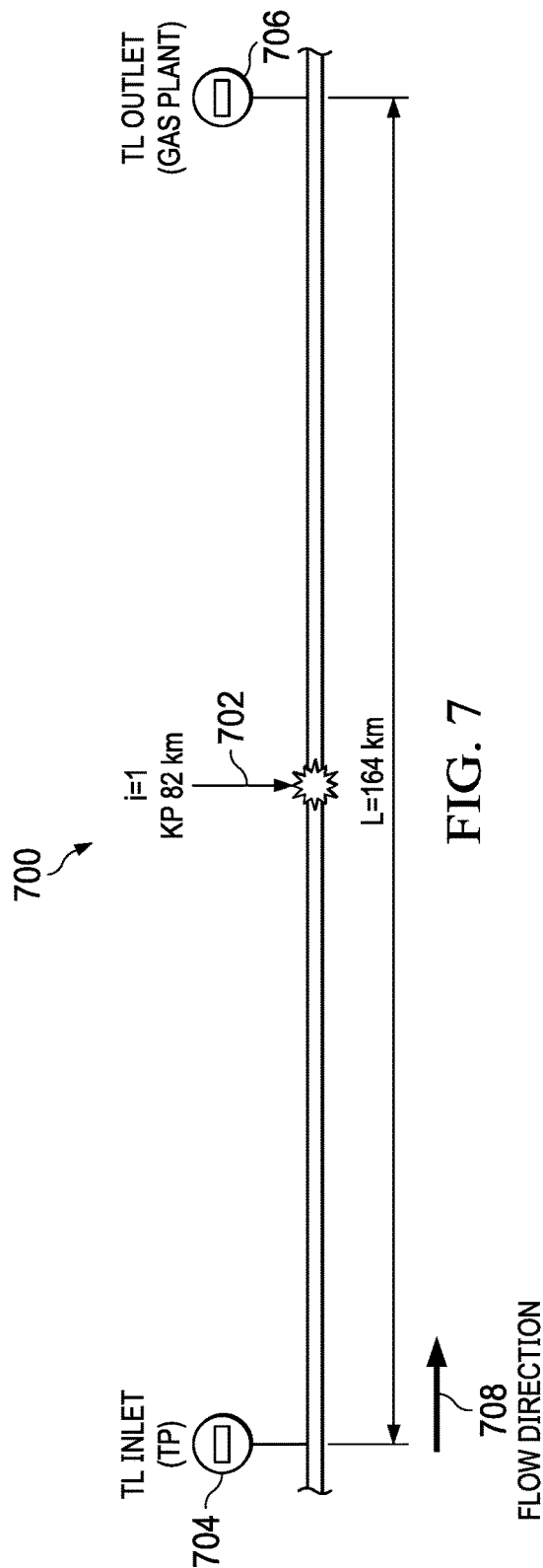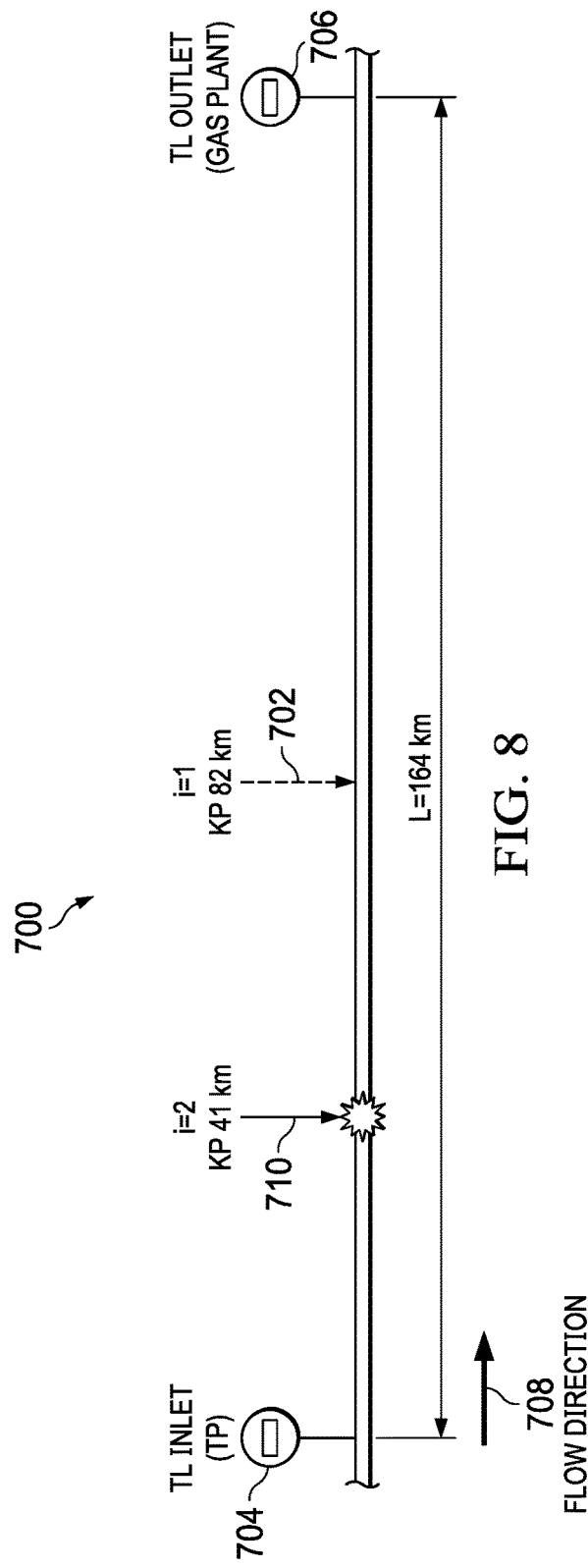

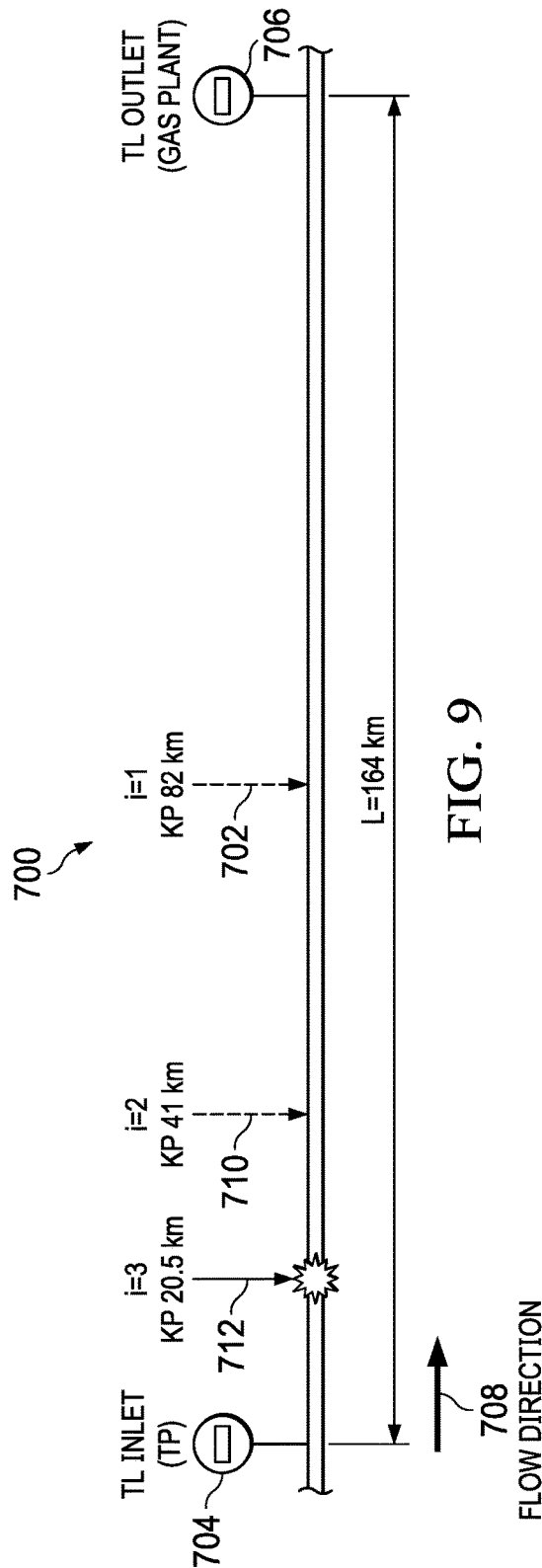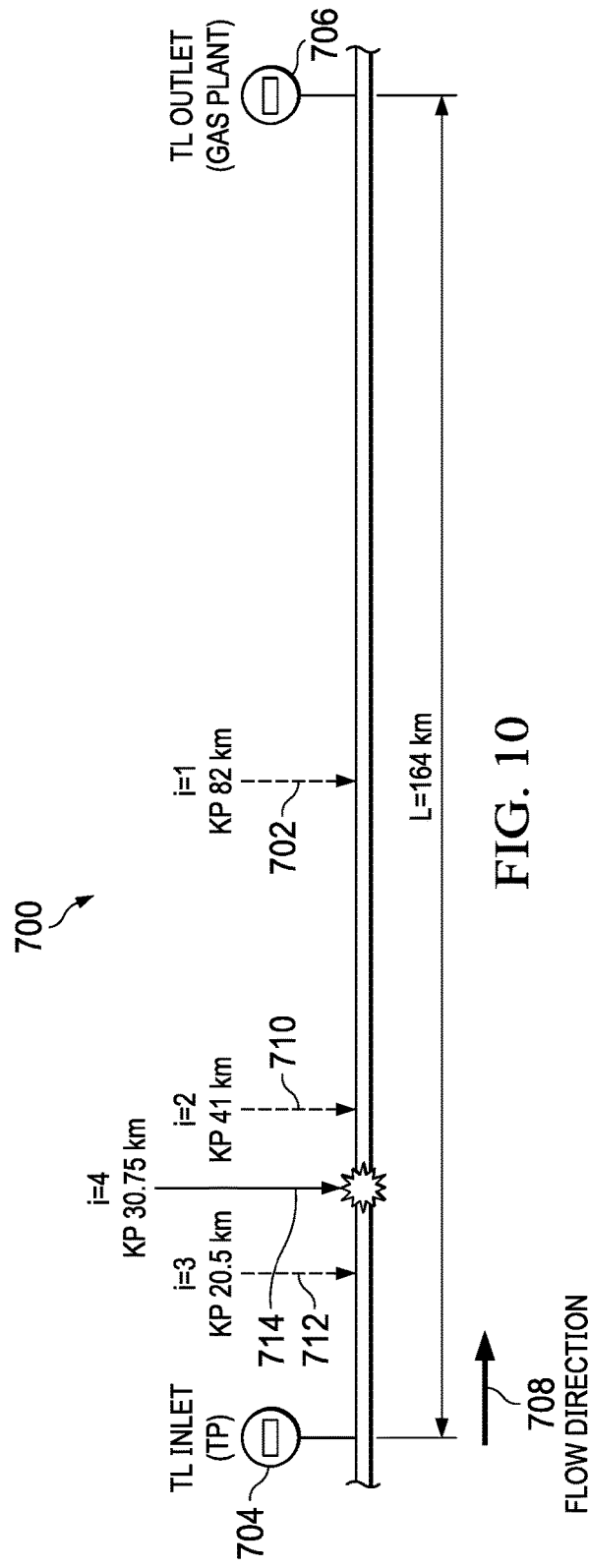

BISECTION NUMERICAL ALGORITHM COUPLED WITH PRESSURE DEVIATION METHOD TO DETERMINE THE SIZE AND LOCATION OF A LEAK IN A PIPELINE

CROSS-REFERENCE TO RELATED APPLICATIONS

This application is a conversion of Provisional Application No. 62/924,364, filed on Oct. 22, 2019, and is hereby incorporated by reference in its entirety.

BACKGROUND

The present disclosure applies to identifying leaks in pipelines. When a leak occurs in a pipeline, it can be difficult for engineers, for example, to identify the location of the leak. Reasons for the difficulty can include the remoteness of the pipeline and the absence of visual sightings and equipment readings that would help to identify the location.

SUMMARY

The present disclosure describes techniques that can be used for precisely determining the size and location of a leak in a pipeline. The proposed leak-locating procedure is based on a pressure deviation procedure coupled with a deterministic bisection numerical method to determine the leak size and identify its location precisely with the least number of numerical iterations. The robustness of the proposed procedure relies on the accuracy of the measured pressure and flowrate upstream and downstream of the actual leakage location.

In some implementations, a computer-implemented method for locating a leak in a pipeline includes the following. Pressure and flowrate measurements are received that correspond to a fluid flowing through a pipeline for which a leak in the pipeline is to be located in a segment of the pipeline. The pressure and flowrate measurements include measurements received for an upstream location and a downstream location. The upstream location is upstream of a center of the segment, and the downstream location is downstream of the center of the segment. A calculated leak size of the leak is determined based on the pressure and flowrate measurements. A first assumed leak location of the leak is identified as being at the center of the segment. A first assumed leak size of the leak is determined based on the first assumed leak location. A simulation is executed that is based on the first assumed leak size, the first assumed leak location, and the pressure and flowrate measurements. Executing the simulation includes producing a virtually measured leak size. A determination is made whether a difference between the virtually measured leak size and the calculated leak size is within an acceptance criterion. In response to determining that the difference between the virtually measured leak size and the calculated leak size is not within the acceptance criterion, a second assumed leak size is iteratively determined, the simulation is re-executed using the second assumed leak size, and the difference is re-determined. A second assumed leak location is iteratively identified, and the simulation is re-executed with at least one assumed leak size to determine an estimated leak location of the leak.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, techniques described in the present disclosure can provide improvements in loss prevention and pipeline management. Second, the techniques use a straightforward algorithm to couple hydraulic modeling with a basic numerical technique. Third, the techniques include a procedure that converges to a precise estimate of the leak location in a rapid pace. Fourth, convergence occurs using a least possible measurements of pressure and flowrate without requiring additional measurements, flowmeters, or transducers are required along the pipeline. Fifth, the techniques can be incorporated in Supervisory Control and Data Acquisition (SCADA) or Pipeline Management System (PMS) to locate leaks automatically and in a short time. For example, leaks can be located without requiring multiple sensors/transmitters along a pipeline to detect and locate a leak precisely, where the accuracy of predicting a leak location depends on the number and accuracy of the sensors/transmitters. Sixth, only one measurement of flowrate and pressure on each side of the actual leak location is required. Seventh, while commercially available leak-locating technologies typically require intrusive or non-intrusive devices (for example, acoustic transmitters, microphones, and scrapers) to locate a leak, the techniques of the present disclosure do not require the utilization of such instruments.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 1 is a map of an example of a pipeline in which a leak has been detected, according to some implementations of the present disclosure.

FIG. 2 is a map of the example of the pipeline indicating an initial assumption of the leak location, according to some implementations of the present disclosure.

FIG. 3 is a map of the example of the pipeline indicating a second assumed leak location [i=2], according to some implementations of the present disclosure.

FIG. 4 is a map of the example of the pipeline indicating a third assumed leak location [i=3], according to some implementations of the present disclosure.

FIG. 5 is a map of the example of the pipeline indicating an nth assumed leak location [i=n], according to some implementations of the present disclosure.

FIG. 7 is a map of an example of a pipeline in which a leak has been detected, according to some implementations of the present disclosure.

FIG. 8 is a map of the example of the pipeline in which a second assumed leak location is used, according to some implementations of the present disclosure.

FIG. 9 is a map of the example of the pipeline in which a third assumed leak location is identified, according to some implementations of the present disclosure.

FIG. 10 is a map of the example of the pipeline in which a fourth assumed leak location is identified, according to some implementations of the present disclosure.

Like reference numbers and designations in the various drawings indicate like elements.

DETAILED DESCRIPTION

Figure 6:
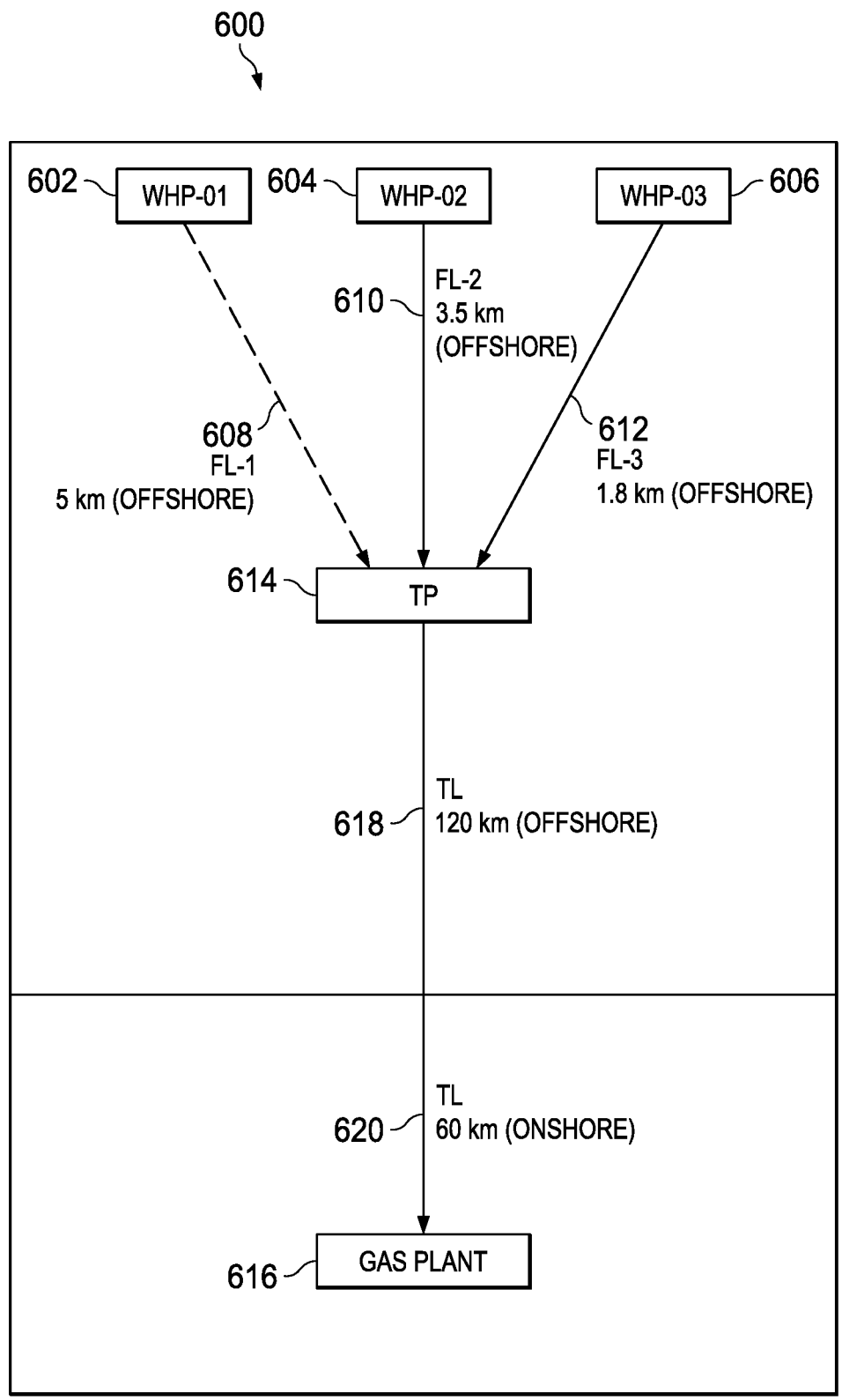
FIG. 6 is a schematic of an example of a gas field, according to some implementations of the present disclosure.

The following detailed description describes techniques for precisely determining the size and location of a leak in a pipeline. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Once a leak is detected and a suspected leaking pipe segment is identified, using leak detection methods and technologies, measurements of flowrate and pressure at points upstream and downstream of the leak location are compared against calculated values in an iterative process. The process is terminated once the difference between the virtually measured and calculated values is within a predetermined criterion. A deterministic bisection numerical technique is used to bracket the leak location in an accelerated pace. A leak is simulated at a location initially assumed at the middle of the leaking pipe segment. The pressure is calculated at upstream and downstream measurement locations relative to the leak location. Based on the difference between the virtually measured and calculated pressures, logic is used to determine whether the leak is at the assumed location, or upstream or downstream of the assumed location. If the leak is determined on either side of the assumed location, a next leak location is assumed in the middle of the pipe segment bounded by the previous assumed location. In each iteration, the length of suspected leaking segment is reduced by a factor of two (to half the previous examined segment) until the acceptance criterion is met.

The proposed procedure will determine the leak location for onshore and offshore pipelines precisely and in an accelerated pace without the need to have multiple sensors along the leaking pipeline. The numerical procedure allows quick and precise determination of the leak location based on measurements of pressure and flowrate at only two locations; upstream and downstream of the actual leak.

The proposed technical solution is based on a numerical technique coupled with assessment of the difference between the virtually measured and calculated pressure and flowrate at two locations bracketing the actual leak location. The proposed technical solution, unlike others, does not require additional sensors nor does it require intrusive or non-intrusive hardware to locate the leak.

Techniques of the present disclosure combine bisection numerical techniques with hydraulic simulations to bracket the leak location in pipeline segments that are rapidly reduced in length by a factor of two in each iteration. The techniques can rely on: 1) accurate and reliable measurements of pressure at both sides of an actual leak, and 2) the availability of a hydraulic model that matches the field data during steady state operations before a leak is detected.

The following example explains a procedure (or workflow) that can be used to determine the size and location of a leak in a pipeline. For example, FIGS. 1-5 are used to describe steps in the procedure for determining the leak's size and location in an offshore gas pipeline after leak is detected.

FIG. 1 is a map of an example of a pipeline 100 in which a leak has been detected, according to some implementations of the present disclosure. An actual leak location 102 is not known, for example, by petroleum engineers. However, the leak is known to exist between an upstream location 104 and a downstream location 106. Pressure and flowrate measurements are available for the upstream location 104 and the downstream location 106. As shown in FIG. 1, a flow direction 108 indicates a direction of flow from the upstream location 104 to the downstream location 106.

In a first step, as shown in FIG. 1, pressure and flowrate measurements are recorded upstream and downstream of the leak. For example, measurements are recorded at the upstream location 104 and a downstream location 106. In this example, it can be assumed that the distance between the two measurement locations is L. Further, the magnitude of the leakage can be estimated by comparing the virtually measured flowrates upstream and downstream the leak.

In a second step, a leakage rate is estimated based on the flowrates that are virtually measured upstream and downstream of the detected leak. The estimate is an initial estimate, based on flowrates at the upstream location 104 and the downstream location 106.

In a third step, in a first iteration i, an initial assumed leak location [i=1] 110 is assumed to be in the middle between the upstream location 104 and the downstream location 106. FIG. 2 is a map of the example of the pipeline 100 indicating an initial assumption of the leak location, according to some implementations of the present disclosure. The initial assumed leak location [i=1] 110 is halfway between (L/2) the upstream location 104 and the downstream location 106.

In a fourth step, a leak size is assumed, and the leak is simulated based on the assumed leak size and initial assumed location (for example, the initial assumed leak location [i=1] 110). The calculated leak rate is compared to the virtually measured value. If the difference (between the calculated leak rate and the virtually measured value) is greater than a predetermined minimum acceptance criterion (for example, a threshold difference or a threshold percentage), then another leak size is assumed and the leak rate is recalculated. This trial and error procedure is continued until the calculated leak rate matches the virtually measured leak rate.

In a fifth step, the pressure is calculated at the upstream and downstream measurement locations based on the assumed leak location (from the third step) and the determined leak size (from the fourth step). The calculated pressure and the virtually measured pressure are compared. In the current example, it is assumed that the upstream virtually measured pressure is greater than the calculated value. Therefore, a second assumed leak location [i=2] 112 can be identified that is halfway between the initial assumed leak location [i=1] 110 and the downstream location 106. FIG. 3 is a map of the example of the pipeline 100 indicating a second assumed leak location [i=2] 112, according to some implementations of the present disclosure. The new assumed leak location has an index [i+1].

In a sixth step, a leak size is assumed and the leak is simulated based on the most recent assumed leak location (for example, the second assumed leak location [i=2] 112). The calculated leak rate is compare to the virtually measured value. If the difference is greater than a predetermined minimum acceptance criterion, then another leak size is assumed, and the leak rate is recalculated. This process is repeated until the calculated leak rate matches the virtually measured leak rate (for example, within a threshold difference or percentage).

In a seventh step, the pressure at the upstream and downstream measurement locations are calculated based on the most recent assumed leak location (for example, the second assumed leak location [i=2] 112) and the determined leak size. The calculated pressure and the virtually measured pressure are compared. In the current example, it is assumed that the upstream measured pressure is less than the calculated value. Therefore, a third assumed leak location [i=3] 114 is identified that is halfway between the second assumed leak location [i=2] 112 and the initial assumed leak location [i=1] 110. FIG. 4 is a map of the example of the pipeline 100 indicating a third assumed leak location [i=3] 114, according to some implementations of the present disclosure. The third assumed leak location [i=3] 114 has an index of [i+2].

In an eighth step, steps 5-7 are repeated n times until the difference between the calculated and measured pressures is within an acceptable criterion. In each iteration, the length of the leaking segment is reduced by a factor of two. In five iterations, for example, the leak can be bracketed $$\text{to a } \frac{L}{2^{(5)}} \left(\text{equal to } \frac{L}{32}\right)$$

segment along the L-long pipeline. FIG. 5 is a map of the example of the pipeline 100 indicating an nth assumed leak location [i=n] 116, according to some implementations of the present disclosure.

A proof of concept corresponding to the techniques of the present disclosure can be verified, for example, by implementing the procedure to determine the location of a hypothetical single leak in an offshore gas production network. For example, the following is a case study for a hypothetical leak in an offshore gas production network.

Case Study

FIG. 6 is a schematic of an example of a gas field 600, according to some implementations of the present disclosure. The gas field 600 consists of three (3) offshore wellhead platforms (WHPs) 602, 604, and 606 with flowlines (FLs) 608, 610, and 612, respectively. All WHPs are tied to an offshore tie-in platform (TP) 614. The production from each WHP is transferred to the TP 614 through a dedicated 16" (16 inches) offshore flowline (FL). The produced gas is commingled at the TP 614 before being transferred from the TP to an onshore gas plant 616 through a 36" trunkline (TL) that includes an offshore segment 618 and an onshore segment 620. The lengths of the FLs and TLs are shown in FIG. 6. Measurements of pressure and flowrate are available, through dedicated pressure transmitters and flowmeters, at each WHP, TP, and at the gas plant 616.

A hydraulic model was developed for the production system using the benchmarked, multiphase oil and gas simulator (OLGA) (version 7.3.3 in this case). In lieu of actual field data, it is assumed that the hydraulic model can be tuned to match the field data; therefore simulation results match the field measurements. Table 1 shows the pressures and flowrates at the WHPs, the TP, and the gas plant for a normal production scenario, for example, when a leak has not been detected. Since it is assumed that the simulation results match the field measurements, the values in Table 1 (which were generated from a simulated scenario) are considered equivalent to field measurements.

TABLE 1

Without Leak Condition

| | Measurements Virtually Measured | | | |
|---|---|---|---|---|
| | Pressure at Inlet Pounds per square inch (psi) | Gas Flowrate Million standard cubic feet per day | Total Mass Rate Kilograms per second (kg/s) (MMSCFD) | Pressure Gradient psi/km |
| FL-1 | 1865 | 366 | 101 | 27.5 |
| FL-2 | 1938 | 548 | 152 | 62.9 |
| FL-3 | 1780 | 325 | 90 | 29.1 |
| TL | 1727 | 1239 | 345 | 4.5 |
| Gas Plant | 1015 | 1239 | 344 | |

A third party was requested to simulate a hypothetical leak somewhere in the production network and generate the corresponding pressure and flowrate results at the WHPs, the TP, and the gas plant. The corresponding hydraulic results for the leak scenario are presented in Table 2. The location and size of the leak were not disclosed to the engineer (for example, the person using the procedures of the present disclosure to narrow down the leak's location). As such, the challenge presented to the engineer was to implement the procedures of the present disclosure to determine the leak size and location by matching the pressure and flowrate constraints illustrated in Table 2.

TABLE 2

Measurements When Leak Is Detected

| | Virtually Measured | | |
|---|---|---|---|
| | Pressure | Flowrate | |
| | psi | MMSCFD | kg/s |
| FL-1 Inlet | 1813 | 366 | 101.4 |
| FL-2 Inlet | 1888 | 548 | 152.0 |
| FL-3 Inlet | 1726 | 325 | 90.1 |
| Total Flowrate from ALL upstream FLs | | 1239 | 343.5 |
| TL Inlet | 1670 | 1239 | 345.4 |
| TL outlet (Gas Plant) | 1015 | 1165 | 324.5 |

TABLE 2-continued

Measurements When Leak Is Detected

| | Virtually Measured | | |
|---|---|---|---|
| | Pressure | Flowrate | |
| | psi | MMSCFD | kg/s |
| Leaking Pipe: Main Trunkline (TL) | | | |
| Leak rate: 74 MMSCFD (21 kg/s) | | | |
| Drop in TL inlet pressure | | 55 psi | |

Table 2 shows that the total flowrate from the three upstream WHPs and at the TP are similar. Since the virtually measured flowrate at the gas plant is less than the TP, it is concluded that the TL is leaking. The magnitude of the leak is 21 kg/s (74 MMSCFD). Detecting the leak and identifying the specific leaking pipe is not within the scope of the present disclosure. However, determining the location of the leak along the leaking pipe by implementing the proposed procedure is demonstrated below.

Trial 1

In a first step, a leak location is assumed to be in the middle of the TL, which is 82 km from its inlet. FIG. 7 is a map of an example of a pipeline 700 in which a leak has been detected, according to some implementations of the present disclosure. A first assumed leak location 702 (for example, at KP 82 km) is halfway between a TL inlet location 704 (for example, the TP) and a TL outlet location 706 (for example, the gas plant). A flow direction 708 indicates the direction of flow from the TL inlet location 704 to the TL outlet location 706.

In a second step, a leak size is assumed, and the leak is simulated. For example, a third-party can simulate a hypothetical leak at the first assumed leak location 702. The simulation can generate the corresponding pressure and flowrate results at the WHPs, the TP, and the gas plant.

In a third step, if the difference between the virtually measured leak (as measured by the simulation, see Table 2) and the calculated leak is within the acceptance criterion of 5%, then execution of the procedure can proceed to the fourth step. Otherwise, the assumed leak size is changed until the difference is within acceptance criterion. Table 3 illustrates the leak rates for various iterations, which occurred in this example. A leak size of 1.55 inches is shown as the result.

In a fourth step, the drop in TL inlet pressure is calculated and compared to the virtually measured drop shown in Table 2. If a difference between the virtually measured and calculated values is greater than 5%, then execution of the procedure can proceed to Trial 2. Otherwise, the assumed leak location is considered acceptable. Table 4 shows that the error between the measured and calculated drop in TL inlet pressure (for example, in pounds per square inch absolute (psia)) is 32%. Therefore, in the current example, execution of the procedure can proceed to Trial 2 (where a second assumed leak location will be identified).

TABLE 3

Leak Rates For Various Iterations

| Trial Sequence i | Assumed Leak Size inch | Calculated Mass Rate at Gas Plant kg/s | Difference in Calculated and Virtually Measured Leak Mass Rate % |
|---|---|---|---|
| 1 | 1.55 | 318 | 33.3 |
| 2 | 1.45 | 323.6 | 4.6 |

TABLE 4

Trial No. 1

| | Assumed leak | Calculated | Drop in TL inlet Pressure | |
|---|---|---|---|---|
| Leak Size inch | Location from TL Inlet km | Pressure at TL Inlet psia | Calculated psi | Difference from Measurement % |
| 1.55 | 82 | 1689 | 38 | −32 |

Trial 2

In a first step, since the calculated drop in TL inlet pressure from Trial 1 is less than the virtually measured value, the leak should be upstream of last assumed location (KP 82 km) in Trial 1. Therefore, a new leak location is assumed in the middle of the TL segment, upstream of KP 82 km. FIG. 8 is a map of the example of the pipeline 700 in which a second assumed leak location 710 is used, according to some implementations of the present disclosure. The location is 41 km downstream of the TL inlet (for example, the TP).

In a second step, a leak size is assumed, a location is assumed at KP 41 km, and the leak is simulated. For example, the second assumed leak location 710 is shown at the KP 41 km mark.

In a third step, if the difference between the virtually measured leak (See Table 2) and the calculated leak is within the acceptance criterion of 5%, then execution of the procedure can proceed to the fourth step. Otherwise, the leak size is changed and the simulation is rerun until the difference is within acceptance criterion. Table 5 shows that a leak size of 1.45" satisfies the acceptance criterion.

In a fourth step, the drop in TL inlet pressure is calculated and compared to the virtually measured drop shown in Table 2. If the difference between the virtually measured and calculated values is greater than 5%, then processing can proceed to Trial 3. Otherwise, the assumed leak location is deemed acceptable. Table 6 shows that the error between the virtually measured and calculated drop in TL inlet pressure is −11%. Therefore, processing can proceed to Trial 3.

TABLE 5

Leak Rates For Various Iterations

| Trial Sequence i | Assumed Leak Size inch | Calculated Mass Rate at Gas Plant kg/s | Difference in Calculated and Virtually Measured Leak Mass Rate % |
|---|---|---|---|
| 1 | 1.55 | 318 | 33.3 |
| 2 | 1.45 | 323.6 | 4.6 |

TABLE 6

Trial No. 2

| | Assumed leak Location | Calculated Pressure | Drop in TL inlet Pressure | |
|---|---|---|---|---|
| Leak Size inch | from TL Inlet km | at TL Inlet psia | Calculated psi | Difference from Measurement % |
| 1.45 | 41 | 1677 | 50 | −11 |

Trial 3

Since the calculated drop in TL inlet pressure from Trial 2 is less than the virtually measured value, the leak should be upstream of last assumed location (KP 41 km). Therefore, a new leak location is assumed in the middle of the TL segment bounded by KP 41 km. In this example, the assumed new leak location is 20.5 km downstream from the TL inlet (e.g., the TP). FIG. 9 is a map of the example of the pipeline 700 in which a third assumed leak location 712 is identified, according to some implementations of the present disclosure. In this example, a leak size is assumed, and the leak is simulated at KP 20.5 km.

If the difference between the virtually measured leak (Table 2) and the calculated leak is within the acceptance criterion of 5%, then execution of the procedure can proceed to step 4. Otherwise, the leak size is changed and the simulation is rerun until the difference is within acceptance criterion. Table 7 shows that a leak size of 1.4" satisfies the acceptance criterion The drop in TL inlet pressure is calculated and compared to the virtually measured drop shown in Table 2. If the difference between the virtually measured and calculated values exceeds 5%, then execution of the procedure can proceed to Trial 4. Otherwise, the assumed leak location is deemed acceptable. Table 8 shows that the error between the virtually measured and calculated drop in TL inlet pressure is 7%. Therefore, execution of the procedure can proceed to Trial 4.

TABLE 7

Leak Rates For Various Iterations

| Trial Sequence i | Assumed Leak Size inch | Calculated Mass Rate at Gas Plant kg/s | Difference in Calculated and Virtually Measured Leak Mass Rate % |
|---|---|---|---|
| 1 | 1.5 | 318.8 | 29.2 |
| 2 | 1.45 | 319.8 | 24.1 |
| 3 | 1.4 | 325 | −2.6 |

TABLE 8

Trial No. 3

| | Assumed leak | Calculated | Drop in TL inlet Pressure | |
| Leak Size inch | Location from TL Inlet km | Pressure at TL Inlet psia | Calculated psi | Difference from Measurement % |
|---|---|---|---|---|
| 1.4 | 20.5 | 1667 | 60 | 7 |

Trial 4

Since the calculated drop in TL inlet pressure from Trial 3 is greater than the virtually measured value, the leak should be downstream of last assumed location (KP 20.5 km). Therefore, a new leak location is assumed in the middle of the TL segment, bounded by KP 20.5 km and KP 41 km. Specifically, the new leak location is 30.75 km downstream from the TL inlet (or the TP). FIG. 10 is a map of the example of the pipeline 700 in which a fourth assumed leak location 714 is identified, according to some implementations of the present disclosure. In this example, a new leak size is assumed, and the leak is simulated at KP 30.75 km.

If the difference between the virtually measured leak (Table 2) and calculated leak is within the acceptance criterion of 5%, execution of the procedure can proceed to step 4. Otherwise, the leak size is changed and the simulation is re-run until the difference is within acceptance criterion. Table 9 shows that a leak size of 1.4" satisfies the acceptance criterion.

The drop in the TL inlet pressure is calculated and compared to the virtually measured drop shown in Table 2. If the difference between the virtually measured and calculated values exceeds 5%, then execution of the procedure can proceed to Trial 5. Otherwise, the assumed leak location is acceptable. Table 10 shows that the error between the virtually measured and calculated drop in TL inlet pressure is −5%. Therefore, it is concluded the leak location is around 30.75 km downstream of the TL inlet.

TABLE 9

Trial No. 4 Results

| Trial Sequence i | Assumed Leak Size inch | Calculated Mass Rate at Gas Plant kg/s | Difference in Calculated and Virtually Measured Leak Mass Rate % |
|---|---|---|---|
| 1 | 1.4 | 323.7 | 4.1 |

TABLE 10

Trial No. 4

| | Assumed leak | Calculated | Drop in TL inlet Pressure | |
| Leak Size inch | Location from TL Inlet km | Pressure at TL Inlet psia | Calculated psi | Difference from Measurement % |
|---|---|---|---|---|
| 1.4 | 30.75 | 1674 | 53 | −5 |

Outcome

Figure 11:
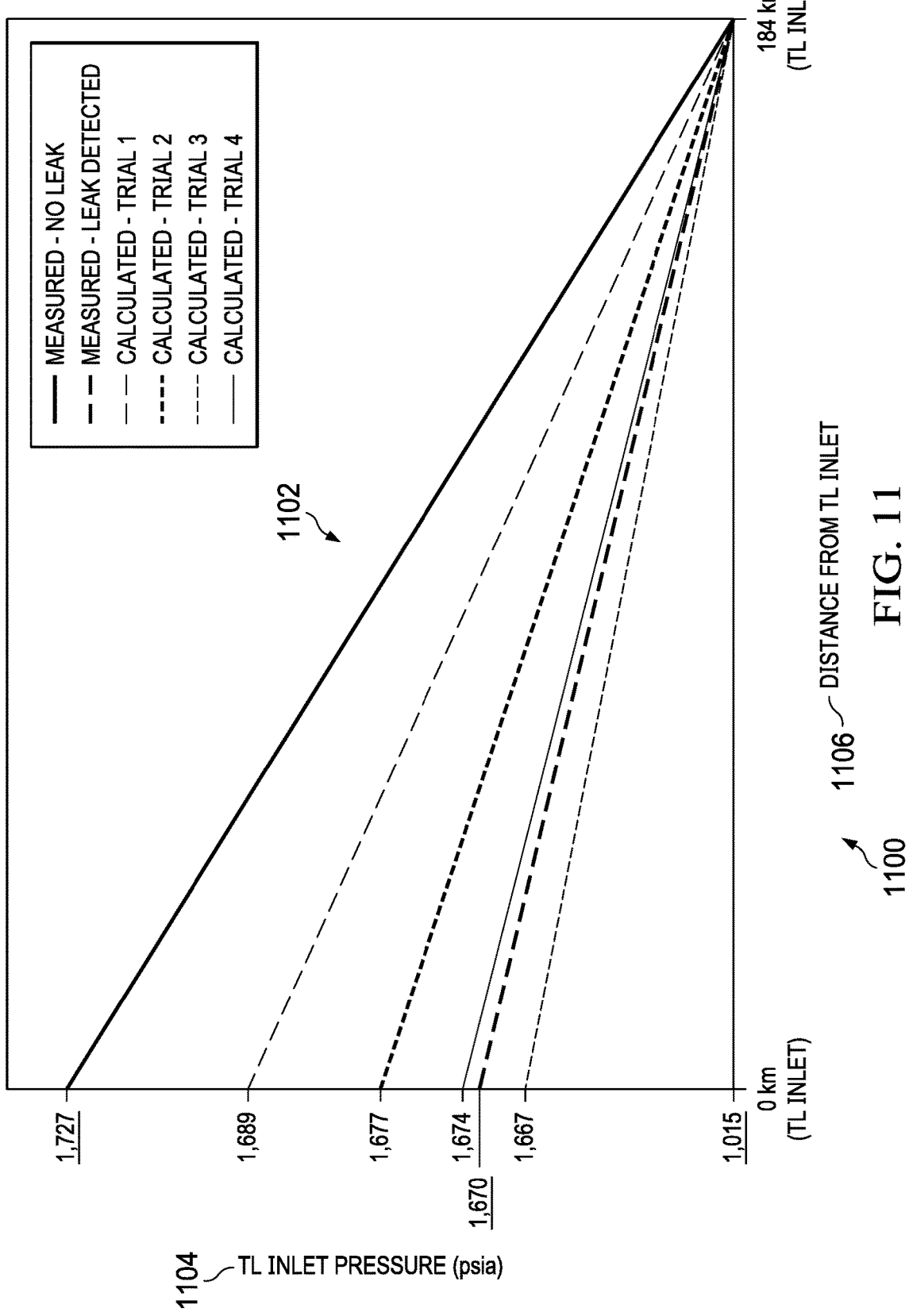
FIG. 11 illustrates a comparison between measured and calculated TL inlet pressure, according to some implementations of the present disclosure.

FIG. 11 is a graph 1100 illustrating a comparison between measured and calculated TL inlet pressures, according to some implementations of the present disclosure. Plotted lines 1102 correspond to the no-leak condition, a measured leak, and Trials 1-4 previously described. The plotted lines 1102 are plotted relative to a pressure axis 1104 and a distance axis 1106.

Figure 12:
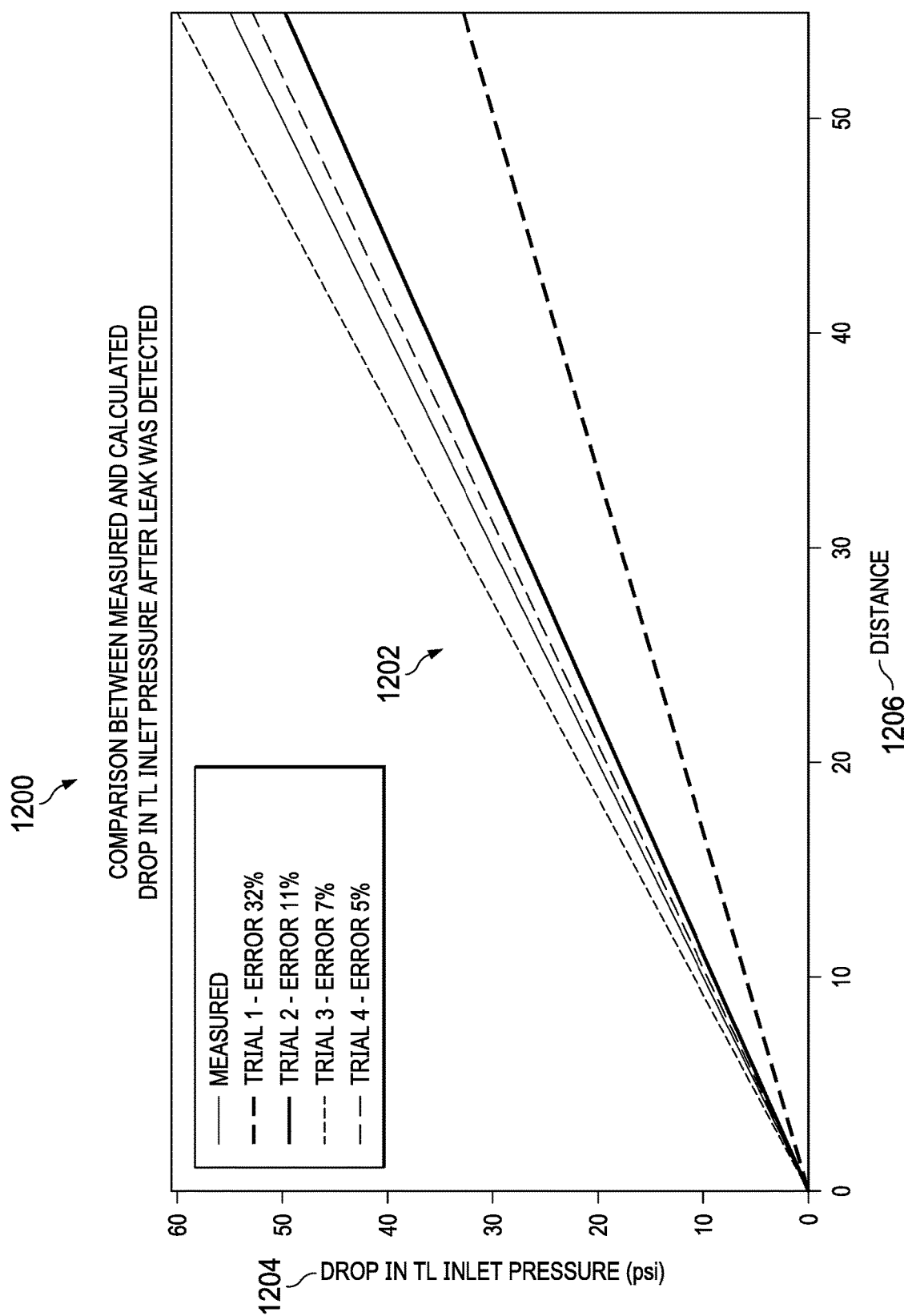
FIG. 12 shows a comparison between the virtually measured and calculated drop in the TL inlet pressure due to the leakage, according to some implementations of the present disclosure.

FIG. 12 shows a chart 1200 for a comparison between the virtually measured and calculated drop in the TL inlet pressure due to the leakage, according to some implementations of the present disclosure. Plotted lines 1202 correspond to the measured leak and trials 1-4 previously described. The plotted lines 1202 are plotted relative to a pressure axis 1204 and a distance axis 1206. In this example, acceptance criteria, hence estimates of leak location and size, were achieved in four iterations. The estimated leak location and size are a leak size of 1.4 inch and a leak location at 30.75 km downstream of the TL inlet. The exact leak size and location, as determined by a third party, included a leak size of 1.43" and a leak location of 27 km downstream of the TL inlet. A conclusion in this case indicates that the predicted leak size is similar to the actual size, and the predicted leak location is within 3.75 km of the actual leak location. Additional iterations could have been used, resulting in a more accurate prediction of the leak location.

Figure 13:
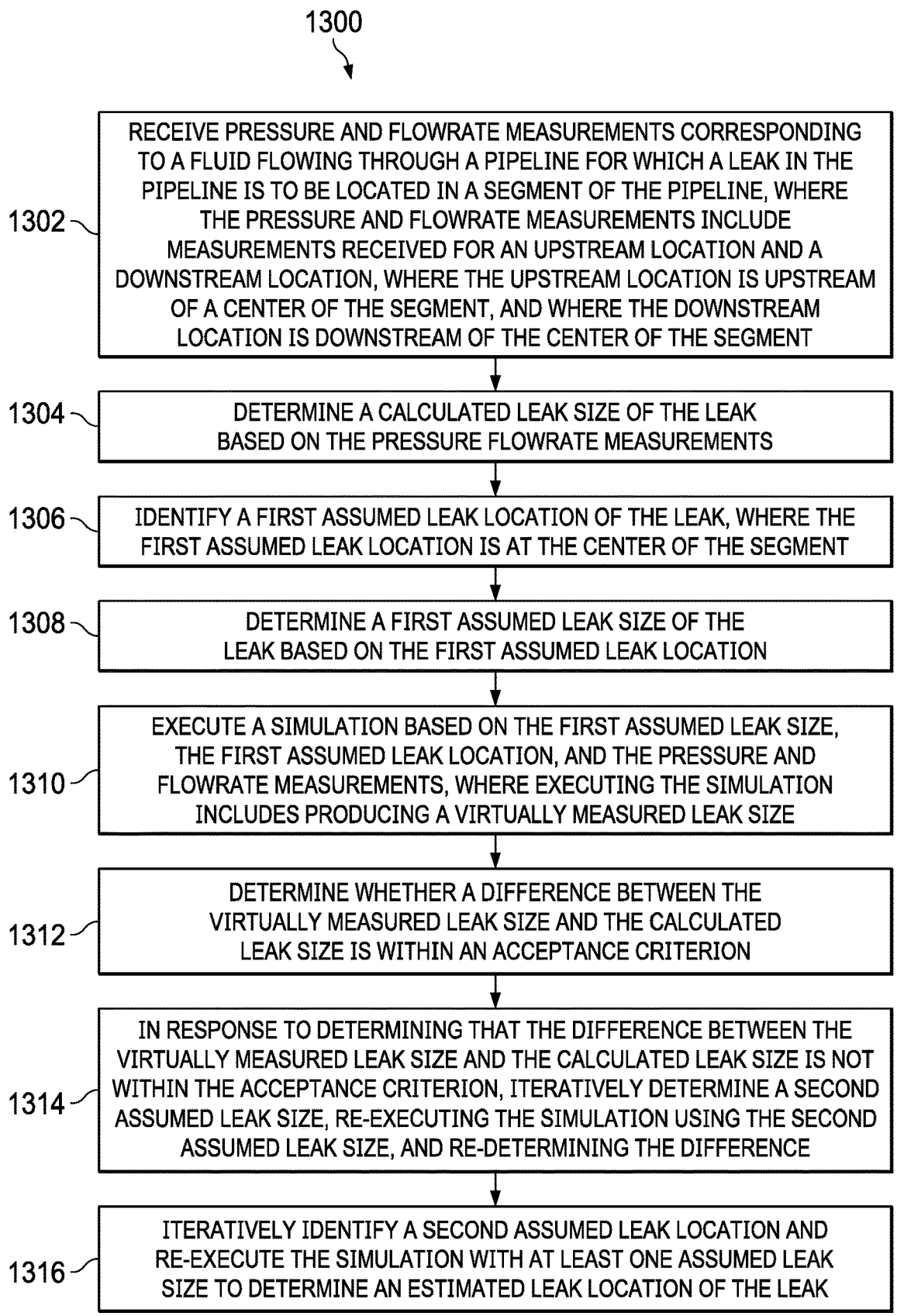
FIG. 13 is a flowchart of an example method for determining an estimated leak location of a leak in a pipeline, according to some implementations of the present disclosure.

FIG. 13 is a flowchart of an example method 1300 for determining an estimated leak location of a leak in a pipeline, according to some implementations of the present disclosure. For clarity of presentation, the description that follows generally describes method 1300 in the context of the other figures in this description. However, it will be understood that method 1300 can be performed, for example, by any suitable system, environment, software, and hardware, or a combination of systems, environments, software, and hardware, as appropriate. In some implementations, various steps of method 1300 can be run in parallel, in combination, in loops, or in any order.

At 1302, pressure and flowrate measurements are received that correspond to a fluid flowing through a pipeline for which a leak in the pipeline is to be located in a segment of the pipeline. For example, the pressure and flowrate measurements can include measurements received for an upstream location and a downstream location. The upstream location can be upstream of a center of the segment, and the downstream location can be downstream of the center of the segment. The measurements can be obtained for the upstream location 104 and the downstream location 106, for example. From 1302, method 1300 proceeds to 1304.

At 1304, a calculated leak size of the leak is determined based on the pressure and flowrate measurements. For example, the leak size of the leak corresponding to the actual leak location 102 can be calculated from the pressure and flowrate measurements received from the upstream location 104 and the downstream location 106. The calculated leak size can be an average diameter of a hole in the pipeline producing the leak, for example. In some implementations, one or both of the total mass rate and the pressure gradient (for example, from Table 1) can be used to determine the calculated leak size. From 1304, method 1300 proceeds to 1306.

At 1306, a first assumed leak location of the leak is identified as being at the center of the segment. For example, the initial assumed leak location 110 can be assumed. From 1306, method 1300 proceeds to 1308.

At 1308, a first assumed leak size of the leak is determined based on the first assumed leak location. For example, the first assumed leak size can be calculated based on the pressure and flowrate measurements received from the upstream location 104 and the downstream location 106. From 1308, method 1300 proceeds to 1310.

At 1310, a simulation is executed that is based on the first assumed leak size, the first assumed leak location, and the pressure and flowrate measurements. For example, executing the simulation can include producing a virtually measured leak size. From 1310, method 1300 proceeds to 1312.

At 1312, a determination is made whether a difference between the virtually measured leak size and the calculated leak size is within an acceptance criterion. For example, the determination can include determining if the difference is within acceptance criterion of a 5% difference between the virtually measured leak size and the calculated leak size. From 1312, method 1300 proceeds to 1314.

At 1314, in response to determining that the difference between the virtually measured leak size and the calculated leak size is not within the acceptance criterion, a second assumed leak size is iteratively determined, the simulation is re-executed using the second assumed leak size, and the difference is re-determined. For example, the steps can be repeated during each iteration that halves the portion of the segment of the pipe that contains the actual leak. From 1314, method 1300 proceeds to 1316.

At 1316, a second assumed leak location is iteratively identified, and the simulation is re-executed with at least one assumed leak size to determine an estimated leak location of the leak. For example, previous steps can be repeated, iteratively halving the portion of the segment of the pipe that contains the actual leak. After 1316, method 1300 can stop.

In some implementations, method 1300 further includes generating a hydraulic model for the pipeline using benchmarked pressure and flowrate measurements of the pipeline, where executing the simulation is further based on the hydraulic model. The hydraulic model can be generated before method 1300 is executed, for example.

Figure 14:
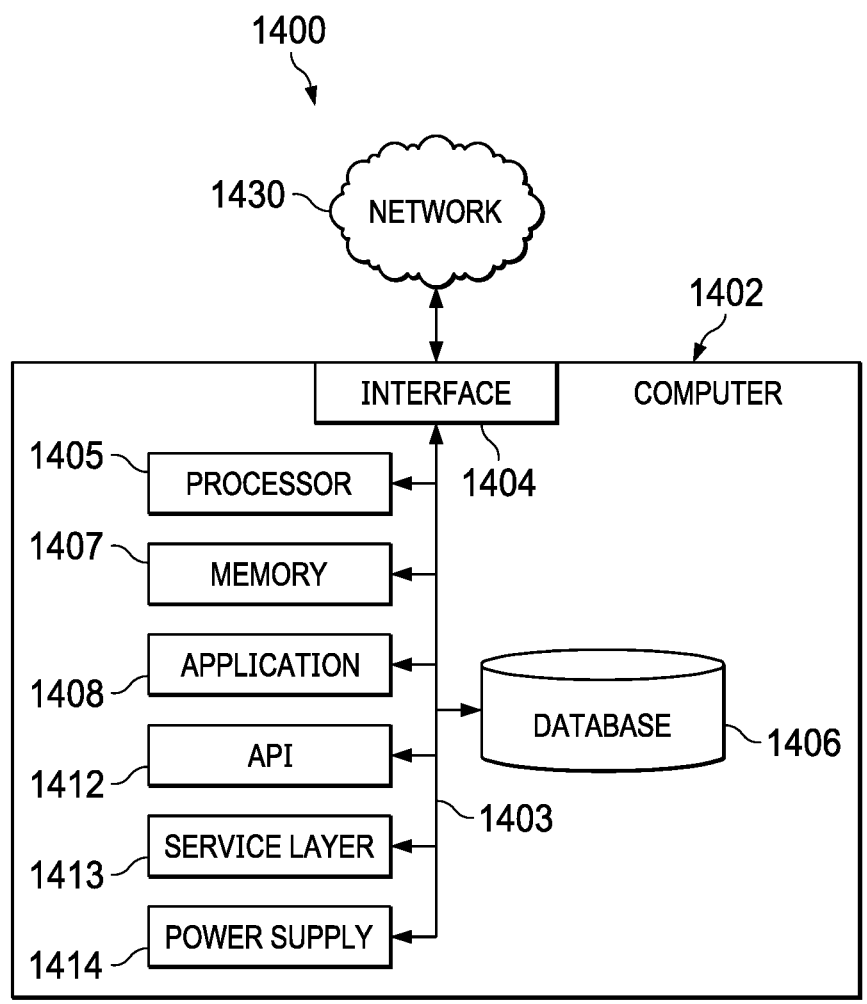
FIG. 14 is a block diagram illustrating an example computer system used to provide computational functionalities associated with described algorithms, methods, functions, processes, flows, and procedures as described in the present disclosure, according to some implementations of the present disclosure.

FIG. 14 is a block diagram of an example computer system 1400 used to provide computational functionalities associated with described algorithms, methods, functions, processes, flows, and procedures described in the present disclosure, according to some implementations of the present disclosure. The illustrated computer 1402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1402 can include input devices such as keypads, keyboards, and touch screens that can accept user information. Also, the computer 1402 can include output devices that can convey information associated with the operation of the computer 1402. The information can include digital data, visual data, audio information, or a combination of information. The information can be presented in a graphical user interface (UI) (or GUI).

The computer 1402 can serve in a role as a client, a network component, a server, a database, a persistency, or components of a computer system for performing the subject matter described in the present disclosure. The illustrated computer 1402 is communicably coupled with a network 1430. In some implementations, one or more components of the computer 1402 can be configured to operate within different environments, including cloud-computing-based environments, local environments, global environments, and combinations of environments.

At a top level, the computer 1402 is an electronic computing device operable to receive, transmit, process, store, and manage data and information associated with the described subject matter. According to some implementations, the computer 1402 can also include, or be communicably coupled with, an application server, an email server, a web server, a caching server, a streaming data server, or a combination of servers.

The computer 1402 can receive requests over network 1430 from a client application (for example, executing on another computer 1402). The computer 1402 can respond to the received requests by processing the received requests using software applications. Requests can also be sent to the computer 1402 from internal users (for example, from a command console), external (or third) parties, automated applications, entities, individuals, systems, and computers.

Each of the components of the computer 1402 can communicate using a system bus 1403. In some implementations, any or all of the components of the computer 1402, including hardware or software components, can interface with each other or the interface 1404 (or a combination of both), over the system bus 1403. Interfaces can use an application programming interface (API) 1412, a service layer 1413, or a combination of the API 1412 and service layer 1413. The API 1412 can include specifications for routines, data structures, and object classes. The API 1412 can be either computer-language independent or dependent. The API 1412 can refer to a complete interface, a single function, or a set of APIs.

The service layer 1413 can provide software services to the computer 1402 and other components (whether illustrated or not) that are communicably coupled to the computer 1402. The functionality of the computer 1402 can be accessible for all service consumers using this service layer. Software services, such as those provided by the service layer 1413, can provide reusable, defined functionalities through a defined interface. For example, the interface can be software written in JAVA, C++, or a language providing data in extensible markup language (XML) format. While illustrated as an integrated component of the computer 1402, in alternative implementations, the API 1412 or the service layer 1413 can be stand-alone components in relation to other components of the computer 1402 and other components communicably coupled to the computer 1402. Moreover, any or all parts of the API 1412 or the service layer 1413 can be implemented as child or sub-modules of another software module, enterprise application, or hardware module without departing from the scope of the present disclosure.

The computer 1402 includes an interface 1404. Although illustrated as a single interface 1404 in FIG. 14, two or more interfaces 1404 can be used according to particular needs, desires, or particular implementations of the computer 1402 and the described functionality. The interface 1404 can be used by the computer 1402 for communicating with other systems that are connected to the network 1430 (whether illustrated or not) in a distributed environment. Generally, the interface 1404 can include, or be implemented using, logic encoded in software or hardware (or a combination of software and hardware) operable to communicate with the network 1430. More specifically, the interface 1404 can include software supporting one or more communication protocols associated with communications. As such, the network 1430 or the interface's hardware can be operable to communicate physical signals within and outside of the illustrated computer 1402.

The computer 1402 includes a processor 1405. Although illustrated as a single processor 1405 in FIG. 14, two or more processors 1405 can be used according to particular needs, desires, or particular implementations of the computer 1402 and the described functionality. Generally, the processor 1405 can execute instructions and can manipulate data to perform the operations of the computer 1402, including operations using algorithms, methods, functions, processes, flows, and procedures as described in the present disclosure.

The computer 1402 also includes a database 1406 that can hold data for the computer 1402 and other components connected to the network 1430 (whether illustrated or not). For example, database 1406 can be an in-memory, conventional, or a database storing data consistent with the present disclosure. In some implementations, database 1406 can be a combination of two or more different database types (for example, hybrid in-memory and conventional databases) according to particular needs, desires, or particular implementations of the computer 1402 and the described functionality. Although illustrated as a single database 1406 in FIG. 14, two or more databases (of the same, different, or combination of types) can be used according to particular needs, desires, or particular implementations of the computer 1402 and the described functionality. While database 1406 is illustrated as an internal component of the computer 1402, in alternative implementations, database 1406 can be external to the computer 1402.

The computer 1402 also includes a memory 1407 that can hold data for the computer 1402 or a combination of components connected to the network 1430 (whether illustrated or not). Memory 1407 can store any data consistent with the present disclosure. In some implementations, memory 1407 can be a combination of two or more different types of memory (for example, a combination of semiconductor and magnetic storage) according to particular needs, desires, or particular implementations of the computer 1402 and the described functionality. Although illustrated as a single memory 1407 in FIG. 14, two or more memories 1407 (of the same, different, or combination of types) can be used according to particular needs, desires, or particular implementations of the computer 1402 and the described functionality. While memory 1407 is illustrated as an internal component of the computer 1402, in alternative implementations, memory 1407 can be external to the computer 1402.

The application 1408 can be an algorithmic software engine providing functionality according to particular needs, desires, or particular implementations of the computer 1402 and the described functionality. For example, application 1408 can serve as one or more components, modules, or applications. Further, although illustrated as a single application 1408, the application 1408 can be implemented as multiple applications 1408 on the computer 1402. In addition, although illustrated as internal to the computer 1402, in alternative implementations, the application 1408 can be external to the computer 1402.

The computer 1402 can also include a power supply 1414. The power supply 1414 can include a rechargeable or non-rechargeable battery that can be configured to be either user- or non-user-replaceable. In some implementations, the power supply 1414 can include power-conversion and management circuits, including recharging, standby, and power management functionalities. In some implementations, the power-supply 1414 can include a power plug to allow the computer 1402 to be plugged into a wall socket or a power source to, for example, power the computer 1402 or recharge a rechargeable battery.

There can be any number of computers 1402 associated with, or external to, a computer system containing computer 1402, with each computer 1402 communicating over network 1430. Further, the terms "client," "user," and other appropriate terminology can be used interchangeably, as appropriate, without departing from the scope of the present disclosure. Moreover, the present disclosure contemplates that many users can use one computer 1402 and one user can use multiple computers 1402.

Described implementations of the subject matter can include one or more features, alone or in combination.

For example, in a first implementation, a computer-implemented method is used for locating a leak in a pipeline. Pressure and flowrate measurements are received that correspond to a fluid flowing through a pipeline for which a leak in the pipeline is to be located in a segment of the pipeline. The pressure and flowrate measurements include measurements received for an upstream location and a downstream location. The upstream location is upstream of a center of the segment, and the downstream location is downstream of the center of the segment. A calculated leak size of the leak is determined based on the pressure and flowrate measurements. A first assumed leak location of the leak is identified as being at the center of the segment. A first assumed leak size of the leak is determined based on the first assumed leak location. A simulation is executed that is based on the first assumed leak size, the first assumed leak location, and the pressure and flowrate measurements. Executing the simulation includes producing a virtually measured leak size. A determination is made whether a difference between the virtually measured leak size and the calculated leak size is within an acceptance criterion. In response to determining that the difference between the virtually measured leak size and the calculated leak size is not within the acceptance criterion, a second assumed leak size is iteratively determined, the simulation is re-executed using the second assumed leak size, and the difference is re-determined. A second assumed leak location is iteratively identified, and the simulation is re-executed with at least one assumed leak size to determine an estimated leak location of the leak.

The foregoing and other described implementations can each, optionally, include one or more of the following features:

A first feature, combinable with any of the following features, the method further including generating a hydraulic model for the pipeline using benchmarked pressure and flowrate measurements of the pipeline, where executing the simulation is further based on the hydraulic model.

A second feature, combinable with any of the previous or following features, where the acceptance criterion is a 5% difference between the virtually measured leak size and the calculated leak size.

A third feature, combinable with any of the previous or following features, where a position of the first assumed leak location is halfway between the upstream location and the downstream location.

A fourth feature, combinable with any of the previous or following features, where the calculated leak size is an average diameter of a hole in the pipeline producing the leak.

A fifth feature, combinable with any of the following features, the method further including: receiving total mass rate measurements corresponding to the fluid flowing through the pipeline for which the leak in the pipeline is to be located; and determining the calculated leak size of the leak based on the total mass rate measurements, the pressure measurements, and the flowrate measurements.

A sixth feature, combinable with any of the following features, the method further including: receiving pressure gradient measurements corresponding to the fluid flowing through the pipeline for which the leak in the pipeline is to be located; and determining the calculated leak size of the leak based on the pressure gradient measurements, the pressure measurements, and the flowrate measurements.

In a second implementation, a non-transitory, computer-readable medium storing one or more instructions executable by a computer system to perform operations including the following. Pressure and flowrate measurements are received that correspond to a fluid flowing through a pipeline for which a leak in the pipeline is to be located in a segment of the pipeline. The pressure and flowrate measurements include measurements received for an upstream location and a downstream location. The upstream location is upstream of a center of the segment, and the downstream location is downstream of the center of the segment. A calculated leak size of the leak is determined based on the pressure and flowrate measurements. A first assumed leak location of the leak is identified as being at the center of the segment. A first assumed leak size of the leak is determined based on the first assumed leak location. A simulation is executed that is based on the first assumed leak size, the first assumed leak location, and the pressure and flowrate measurements. Executing the simulation includes producing a virtually measured leak size. A determination is made whether a difference between the virtually measured leak size and the calculated leak size is within an acceptance criterion. In response to determining that the difference between the virtually measured leak size and the calculated leak size is not within the acceptance criterion, a second assumed leak size is iteratively determined, the simulation is re-executed using the second assumed leak size, and the difference is re-determined. A second assumed leak location is iteratively identified, and the simulation is re-executed with at least one assumed leak size to determine an estimated leak location of the leak.

The foregoing and other described implementations can each, optionally, include one or more of the following features:

A first feature, combinable with any of the following features, the operations further including generating a hydraulic model for the pipeline using benchmarked pressure and flowrate measurements of the pipeline, where executing the simulation is further based on the hydraulic model.

A second feature, combinable with any of the previous or following features, where the acceptance criterion is a 5% difference between the virtually measured leak size and the calculated leak size.

A third feature, combinable with any of the previous or following features, where a position of the first assumed leak location is halfway between the upstream location and the downstream location.

A fourth feature, combinable with any of the previous or following features, where the calculated leak size is an average diameter of a hole in the pipeline producing the leak.

A fifth feature, combinable with any of the following features, the operations further including: receiving total mass rate measurements corresponding to the fluid flowing through the pipeline for which the leak in the pipeline is to be located; and determining the calculated leak size of the leak based on the total mass rate measurements, the pressure measurements, and the flowrate measurements.

A sixth feature, combinable with any of the following features, the operations further including: receiving pressure gradient measurements corresponding to the fluid flowing through the pipeline for which the leak in the pipeline is to be located; and determining the calculated leak size of the leak based on the pressure gradient measurements, the pressure measurements, and the flowrate measurements.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. Pressure and flowrate measurements are received that correspond to a fluid flowing through a pipeline for which a leak in the pipeline is to be located in a segment of the pipeline. The pressure and flowrate measurements include measurements received for an upstream location and a downstream location. The upstream location is upstream of a center of the segment, and the downstream location is downstream of the center of the segment. A calculated leak size of the leak is determined based on the pressure and flowrate measurements. A first assumed leak location of the leak is identified as being at the center of the segment. A first assumed leak size of the leak is determined based on the first assumed leak location. A simulation is executed that is based on the first assumed leak size, the first assumed leak location, and the pressure and flowrate measurements. Executing the simulation includes producing a virtually measured leak size. A determination is made whether a difference between the virtually measured leak size and the calculated leak size is within an acceptance criterion. In response to determining that the difference between the virtually measured leak size and the calculated leak size is not within the acceptance criterion, a second assumed leak size is iteratively determined, the simulation is re-executed using the second assumed leak size, and the difference is re-determined. A second assumed leak location is iteratively identified, and the simulation is re-executed with at least one assumed leak size to determine an estimated leak location of the leak.

The foregoing and other described implementations can each, optionally, include one or more of the following features:

A first feature, combinable with any of the following features, the operations further including generating a hydraulic model for the pipeline using benchmarked pressure and flowrate measurements of the pipeline, where executing the simulation is further based on the hydraulic model.

A second feature, combinable with any of the previous or following features, where the acceptance criterion is a 5% difference between the virtually measured leak size and the calculated leak size.

A third feature, combinable with any of the previous or following features, where a position of the first assumed leak location is halfway between the upstream location and the downstream location.

A fourth feature, combinable with any of the previous or following features, where the calculated leak size is an average diameter of a hole in the pipeline producing the leak.

A fifth feature, combinable with any of the following features, the operations further including: receiving total mass rate measurements corresponding to the fluid flowing through the pipeline for which the leak in the pipeline is to be located; and determining the calculated leak size of the leak based on the total mass rate measurements, the pressure measurements, and the flowrate measurements.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
generating pressure and flowrate measurements corresponding to a fluid flowing through a pipeline for which a leak in the pipeline is to be located in a segment of the pipeline, wherein the pressure and flowrate measurements include measurements generated for an upstream location and a downstream location, wherein the upstream location is upstream of a center of the segment, and wherein the downstream location is downstream of the center of the segment;
determining a calculated leak size of the leak based on the pressure and flowrate measurements;
identifying a first assumed leak location of the leak, wherein the first assumed leak location is at the center of the segment;
determining a first assumed leak size of the leak based on the first assumed leak location;
executing a simulation based on the first assumed leak size, the first assumed leak location, and the pressure and flowrate measurements, wherein executing the simulation includes producing a virtually measured leak size;
determining whether a difference between the virtually measured leak size and the calculated leak size is within an acceptance criterion; and
in response to determining that the difference between the virtually measured leak size and the calculated leak size is not within the acceptance criterion, iteratively:
determining a second assumed leak size, re-executing the simulation using the second assumed leak size, and re-determining the difference;
performing iterations of identifying a second assumed leak location, and re-executing the simulation with at least one assumed leak size to determine an estimated leak location of the leak; and
repeating the iterations until differences between virtually measured and calculated flowrates and pressures at points upstream and downstream of the second assumed leak location are within predetermined criteria.

2. The computer-implemented method of claim 1, further comprising generating a hydraulic model for the pipeline using benchmarked pressure and flowrate measurements of the pipeline, wherein executing the simulation is further based on the hydraulic model.

3. The computer-implemented method of claim 1, wherein the acceptance criterion is a 5% difference between the virtually measured leak size and the calculated leak size.

4. The computer-implemented method of claim 1, wherein a position of the first assumed leak location is halfway between the upstream location and the downstream location.

5. The computer-implemented method of claim 1, wherein the calculated leak size is an average diameter of a hole in the pipeline producing the leak.

6. The computer-implemented method of claim 1, further comprising:
receiving total mass rate measurements corresponding to the fluid flowing through the pipeline for which the leak in the pipeline is to be located; and
determining the calculated leak size of the leak based on the total mass rate measurements, the pressure measurements, and the flowrate measurements.

7. The computer-implemented method of claim 1, further comprising:
receiving pressure gradient measurements corresponding to the fluid flowing through the pipeline for which the leak in the pipeline is to be located; and
determining the calculated leak size of the leak based on the pressure gradient measurements, the pressure measurements, and the flowrate measurements.

8. A non-transitory, computer-readable medium storing one or more instructions executable by a computer system to perform operations comprising:
generating pressure and flowrate measurements corresponding to a fluid flowing through a pipeline for which a leak in the pipeline is to be located in a segment of the pipeline, wherein the pressure and flowrate measurements include measurements generated for an upstream location and a downstream location, wherein the upstream location is upstream of a center of the segment, and wherein the downstream location is downstream of the center of the segment;
determining a calculated leak size of the leak based on the pressure and flowrate measurements;
identifying a first assumed leak location of the leak, wherein the first assumed leak location is at the center of the segment;
determining a first assumed leak size of the leak based on the first assumed leak location;
executing a simulation based on the first assumed leak size, the first assumed leak location, and the pressure and flowrate measurements, wherein executing the simulation includes producing a virtually measured leak size;
determining whether a difference between the virtually measured leak size and the calculated leak size is within an acceptance criterion; and
in response to determining that the difference between the virtually measured leak size and the calculated leak size is not within the acceptance criterion, iteratively:
determining a second assumed leak size, re-executing the simulation using the second assumed leak size, and re-determining the difference;
performing iterations of identifying a second assumed leak location, and re-executing the simulation with at least one assumed leak size to determine an estimated leak location of the leak; and repeating the iterations until differences between virtually measured and calculated flowrates and pressures at points upstream and downstream of the second assumed leak location are within predetermined criteria.

9. The non-transitory, computer-readable medium of claim 8, the operations further comprising generating a hydraulic model for the pipeline using benchmarked pressure and flowrate measurements of the pipeline, wherein executing the simulation is further based on the hydraulic model.

10. The non-transitory, computer-readable medium of claim 8, wherein the acceptance criterion is a 5% difference between the virtually measured leak size and the calculated leak size.

11. The non-transitory, computer-readable medium of claim 8, wherein a position of the first assumed leak location is halfway between the upstream location and the downstream location.

12. The non-transitory, computer-readable medium of claim 8, wherein the calculated leak size is an average diameter of a hole in the pipeline producing the leak.

13. The non-transitory, computer-readable medium of claim 8, the operations further comprising:
receiving total mass rate measurements corresponding to the fluid flowing through the pipeline for which the leak in the pipeline is to be located; and
determining the calculated leak size of the leak based on the total mass rate measurements, the pressure measurements, and the flowrate measurements.

14. The non-transitory, computer-readable medium of claim 8, the operations further comprising:
receiving pressure gradient measurements corresponding to the fluid flowing through the pipeline for which the leak in the pipeline is to be located; and
determining the calculated leak size of the leak based on the pressure gradient measurements, the pressure measurements, and the flowrate measurements.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
generating pressure and flowrate measurements corresponding to a fluid flowing through a pipeline for which a leak in the pipeline is to be located in a segment of the pipeline, wherein the pressure and flowrate measurements include measurements generated for an upstream location and a downstream location, wherein the upstream location is upstream of a center of the segment, and wherein the downstream location is downstream of the center of the segment;
determining a calculated leak size of the leak based on the pressure and flowrate measurements;
identifying a first assumed leak location of the leak, wherein the first assumed leak location is at the center of the segment;
determining a first assumed leak size of the leak based on the first assumed leak location;
executing a simulation based on the first assumed leak size, the first assumed leak location, and the pressure and flowrate measurements, wherein executing the simulation includes producing a virtually measured leak size;
determining whether a difference between the virtually measured leak size and the calculated leak size is within an acceptance criterion; and
in response to determining that the difference between the virtually measured leak size and the calculated leak size is not within the acceptance criterion, iteratively:
determining a second assumed leak size, re-executing the simulation using the second assumed leak size, and re-determining the difference;
performing iterations of identifying a second assumed leak location, and re-executing the simulation with at least one assumed leak size to determine an estimated leak location of the leak; and
repeating the iterations until differences between virtually measured and calculated flowrates and pressures at points upstream and downstream of the second assumed leak location are within predetermined criteria.

16. The computer-implemented system of claim 15, the operations further comprising generating a hydraulic model for the pipeline using benchmarked pressure and flowrate measurements of the pipeline, wherein executing the simulation is further based on the hydraulic model.

17. The computer-implemented system of claim 15, wherein the acceptance criterion is a 5% difference between the virtually measured leak size and the calculated leak size.

18. The computer-implemented system of claim 15, wherein a position of the first assumed leak location is halfway between the upstream location and the downstream location.

19. The computer-implemented system of claim 15, wherein the calculated leak size is an average diameter of a hole in the pipeline producing the leak.

20. The computer-implemented system of claim 15, the operations further comprising:
receiving total mass rate measurements corresponding to the fluid flowing through the pipeline for which the leak in the pipeline is to be located; and
determining the calculated leak size of the leak based on the total mass rate measurements, the pressure measurements, and the flowrate measurements.

\* \* \* \* \*

UNITED STATES PATENT AND TRADEMARK OFFICE
CERTIFICATE OF CORRECTION

| | |
|---|---|
| PATENT NO. | : 11,263,374 B2 |
| APPLICATION NO. | : 17/061425 |
| DATED | : March 1, 2022 |
| INVENTOR(S) | : Al Daas |

It is certified that error appears in the above-identified patent and that said Letters Patent is hereby corrected as shown below:

On the Title Page

Item (57) (Abstract), Line 5, delete "based pressure" and insert -- based on pressure --.

Signed and Sealed this
Seventh Day of June, 2022

Katherine Kelly Vidal
*Director of the United States Patent and Trademark Office*